United States Patent
Cheng (10) Patent No.: US 8,209,636 B2
(45) Date of Patent: Jun. 26, 2012

(54) CONTROL SYSTEM BASED ON IMAGE OR VOICE IDENTIFICATION AND A CONTROL METHOD THEREOF

(76) Inventor: Yuan-Fei Cheng, Changjhih Township, Pingtung County (TW)

(*) Notice: Subject to any disclaimer, the term of this patent is extended or adjusted under 35 U.S.C. 154(b) by 939 days.

(21) Appl. No.: 12/241,142

(22) Filed: Sep. 30, 2008

(65) Prior Publication Data

US 2009/0327957 A1 Dec. 31, 2009

(30) Foreign Application Priority Data

Jun. 27, 2008 (TW) ................................. 97124219 A (51) Int. Cl.
*G06F 3/033* (2006.01)
(52) U.S. Cl. ....................................................... 715/863
(58) Field of Classification Search .................. 715/863, 715/810

See application file for complete search history.

(56) References Cited

U.S. PATENT DOCUMENTS

| | | | | |
|---|---|---|---|---|
| 4,608,360 A | * | 8/1986 | Abrevaya et al. | 502/226 |
| 6,496,927 B1 | | 12/2002 | McGrane et al. | |
| 6,604,076 B1 | * | 8/2003 | Holley et al. | 704/270.1 |
| 7,321,360 B1 | * | 1/2008 | Goren | 345/168 |
| 7,401,732 B2 | | 7/2008 | Haddad | |
| 7,742,923 B2 | * | 6/2010 | Bickel et al. | 704/275 |
| 2002/0052746 A1 | * | 5/2002 | Handelman | 704/270 |

* cited by examiner

*Primary Examiner* — Omar Abdul-Ali
(74) *Attorney, Agent, or Firm* — Alan Kamrath; Kamrath IP Lawfirm, PA (57) ABSTRACT

A control system based on image or voice identification includes a display unit, an order-catching device, a control device, a database and an acting device. A control method thereof includes steps of: showing a plurality of selection codes by the display unit for a user to observe and give an order according to one of the selection codes; catching images or voices of the order through the order-catching device and delivering the caught order to the control device; interpreting the order to obtain an action code, searching the database, and identifying one of the selection codes identical to the action code by the control device; and transmitting a control signal from the control device to the acting device, with the control signal corresponding to the selection code.

36 Claims, 6 Drawing Sheets

CONTROL SYSTEM BASED ON IMAGE OR VOICE IDENTIFICATION AND A CONTROL METHOD THEREOF

BACKGROUND OF THE INVENTION

1. Field of the Invention

The present invention relates to a control system and a control method thereof and, more particularly, to a control system based on image or voice identification and providing a plurality of electric actions for selection.

2. Description of the Related Art

A conventional control system based on image identification generally includes a camera device and a control device. Said two devices electrically connect to each other, with the camera device catching an image of a user's motion, transferring the image into digital data, and delivering the caught data to the control device. The control device further executes a digital signal process over the digital data, so as to interpret the user's motion, obtain the meaning thereof and perform electric actions that the user desires.

However, when using the conventional control system, the user must express what he desires through various motions or gestures, such as five raised fingers for "turning on the TV", three raised fingers for "turning on the TV", one raised finger for "turning the volume up", and a first for "turning the volume down". By executing the digital signal process, the control device must precisely identify all the digital data transferred from the images of the user's various motions or gestures to interpret said motions or gestures. The above processes of the conventional control method may cause a high degree of difficulty of a precise interpretation and a large time for said precise interpretation, and which may also easily lead to an incorrect electric action that is not desired owing to a misinterpreted motion or gesture if the interpretation is not precise enough. Besides, for users who are disabled or invalid, it is inconvenient to express so many motions or gestures to use the conventional control system. Furthermore, the number of electric actions for selection is limited, because the various motions or gestures that can be expressed by the user is also limited.

Accordingly, there is a need for redesigning the conventional control system and the control method thereof.

SUMMARY OF THE INVENTION

The primary objective of this invention is to provide a control system based on image or voice identification with a database storing a plurality of binary selection codes and a listing device showing two alternative states to represent "0" and "1" of the binary selection code, such that many terms are provided for the user to choose.

The secondary objective of this invention is to provide the control system based on image or voice identification showing the binary selection codes with the listing device for a user to follow and express with two different expressions, voices, motions or gestures expressed alternatively, such that the way to operate the control system is simple.

Another objective of this invention is to provide the control system based on image or voice identification with a control device interpreting expressions, voices, motions or gestures expressed by the user and then obtaining an action code, so as to shorten the time for interpretation, decrease the occurrence of misinterpretation, and increase the accuracy of interpretation.

The control system based on image or voice identification in accordance with an aspect of the present invention includes a listing device, an order-catching device, a control device, and an acting device. The listing device has a display unit showing a plurality of selection codes corresponding with a plurality of electric actions for a user to give an order according to one of the selection codes. The order-catching device catches the order given by the user. The control device electrically connects to the order-catching devices interprets the caught order, and thus obtains an action code, with the control device having an action database storing said selection codes. The acting device electrically connects to the control device. The selection codes and the action code are binary codes, and the display unit shows each of the selection codes by two alternative states.

The control method of the proposed control system based on image or voice identification in accordance with the aspect of the present invention includes the steps of showing a plurality of selection codes by a display unit of the listing device for a user to observe and give an order according to one of the selection codes; catching images or voices of the order through the order-catching device and delivering the caught order to the control device; interpreting the order to obtain an action code and identifying one of the selection codes identical to the action code by the control device; and transmitting a control signal from the control device to the acting device, with the control signal corresponding to the selection code.

Further scope of the applicability of the present invention will become apparent from the detailed description given hereinafter in connection with drawings. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinafter and the accompanying drawings that are given by way of illustration only and not limitations of the present invention, wherein.

In the various figures of the drawings, the same numerals designate the same or similar parts. Furthermore, when the terms "first", "second", "third", "last", "next" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 1:
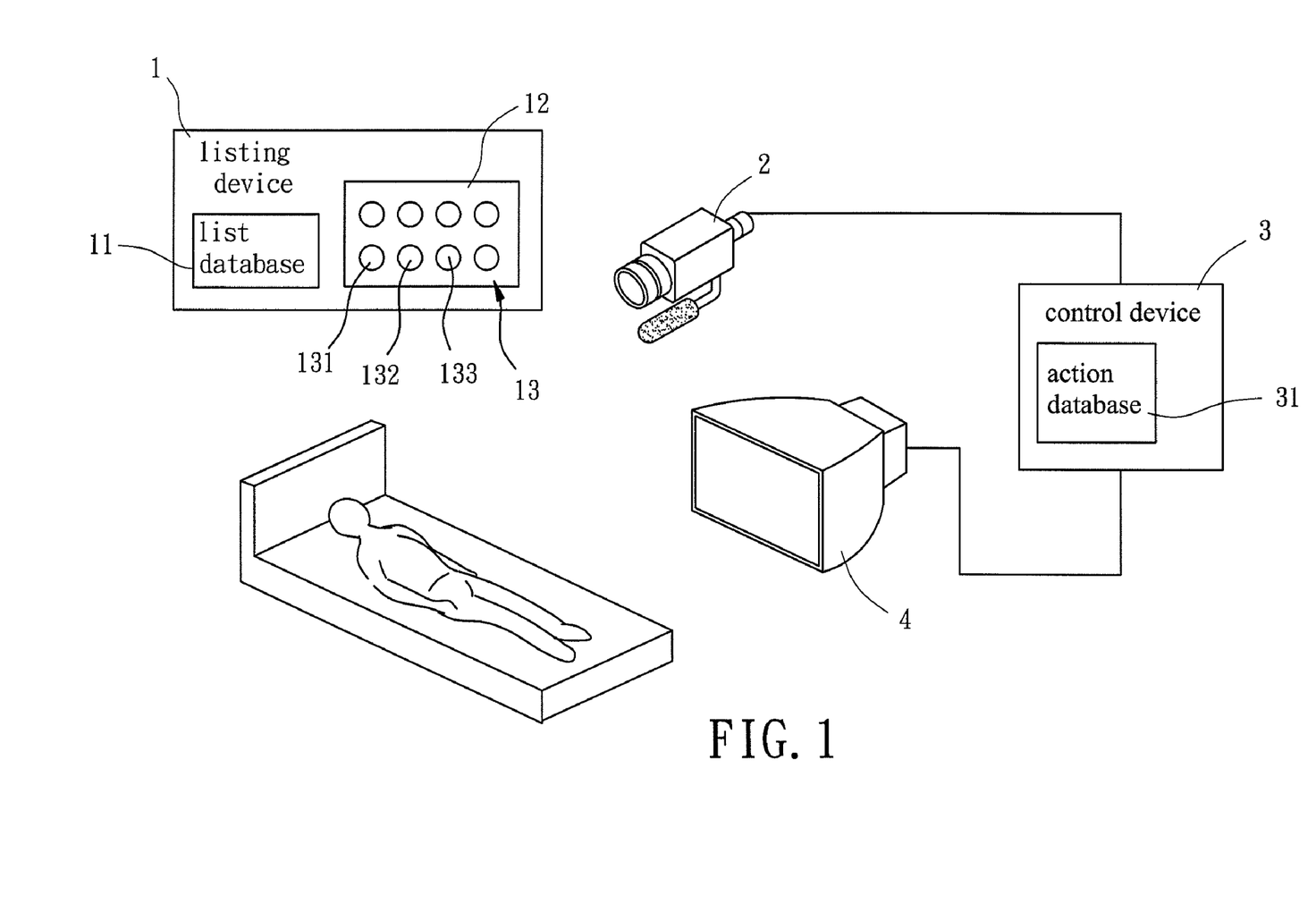
FIG. 1 is a structural sketch illustrating a control system based on image or voice identification in accordance with a first embodiment of the present invention.

Referring now to FIG. 1, a first embodiment of a control system based on image or voice identification includes a listing device 1, an order-catching device 2, a control device 3, and an acting device 4.

The goal of using the proposed control system is to automatically control the acting device 4 without direct manual control motions over said acting device 4. For example, as shown in FIG. 1, when the control system is applied in a ward and the acting device 4 is a TV set, a patient can easily turn on/off the TV or switch the channel of the TV without getting off the bed where he lies in. In detail, during the process that a user remotely controls the acting device 4, what the user has to do is to observe the listing device 1 that shows a list of selection codes corresponding with a plurality of electric actions, choose one of the selection codes, and give an order according to the chosen selection code through expressions, voices, gestures or motions. Afterward, the order-catching device 2 catches the order given by the user automatically, and the control device 3 further interprets the order and controls the acting device 4 to perform the electric action corresponding to the chosen selection code. The acting device 4 can be selected from any kind of electric appliance, such as a TV set, an audio set, a washer, or a dryer. Besides, the control device 3 can be electrically connected with more than one acting device 4.

The listing device 1 of the first embodiment includes a list database 11 for storing the selection codes, and a display unit 12 for showing said selection codes. Information of the electric action corresponding with each selection code can also be shown by the display unit 12. However, it can be omitted if a specification with said information is provided.

In detail, preferably, the selection codes stored in the list database 11 and corresponding with the electric actions are binary codes, with the display unit 12 showing two alternative states to represent "0" and "1" of each binary selection code. For example, the two states shown by the display unit 12 can be selected from "brightness" and "darkness" in luminance of a light, "white" and "black" in colors, "beep" and "silence" in voice, "O" and "X" in characters, or "circle" and "square" in patterns. Besides, the display unit 12 can also be formed by a circuit board showing all the selection codes through a plurality of lamps or light emitting diodes (LED) with various circuits for different selection codes, and, thus, the list database 11 can be omitted conditionally.

Furthermore, in a predetermined cycle time, the display unit 12 alternatively and continuously shows the two states with various lengths of time for completely presenting each of the selection codes in said predetermined cycle time. Namely, the predetermined cycle time is a period of time for the display unit 12 to exactly present the selection codes. For different environments, the selection codes may respectively correspond with different electric actions for a user to choose. For instance, the electric actions can be "turning on/off lights", "adjusting the raise angle of a bed" and "calling a nurse" in a ward. Alternatively, the electric actions can also be "turning on/off electric appliances", "switching channels of a TV set", "switching homepages shown by a computer", "adjusting the level of water of a washer" or "setting work time of a microwave oven" in a house. The display unit 12 of the first embodiment is preferably selected from a plurality of lamps, with each lamp providing two states as "on" and "off", presenting one of the selection codes, and being denoted as "13". Besides, any one of the lamps 13 repeatedly and continuously presents the same selection code for the user to observe and choose.

In order to illustrate the operation of the listing device 1, an example is given as the following. In this example, the predetermined cycle time is set as 6 seconds. Three electric actions, "turning on a TV", "turning off a TV" and "switching to Channel 1", respectively correspond to first, second and third selection codes. The first, second and third selection codes are "110110", "011011" and "100100" and are presented by a first lamp 131, a second lamp 132, and a third lamp 133, with "being turned on for 1 second" representing "1" and "being turned off for 1 second" representing "0" of the binary selection codes. With the above definitions, the first lamp 131 presents the first selection code by "ON for 2 seconds, OFF for 1 second, ON for 2 seconds, and OFF for 1 second"; the second lamp 132 presents the second selection code by "OFF for 1 second, ON for 2 seconds, OFF for 1 second, and ON for 2 seconds"; and the third lamp 133 presents the third selection code by "ON for 1 second, OFF for 2 seconds, ON for 1 second, and OFF for 2 seconds". As a result, the display unit 12 can easily present several selection codes corresponding with various electric actions for the user to choose. Besides, the type of the lamps 13 is adjustable, to provide larger or brighter lamps for a user weak in sight.

Figure 2:
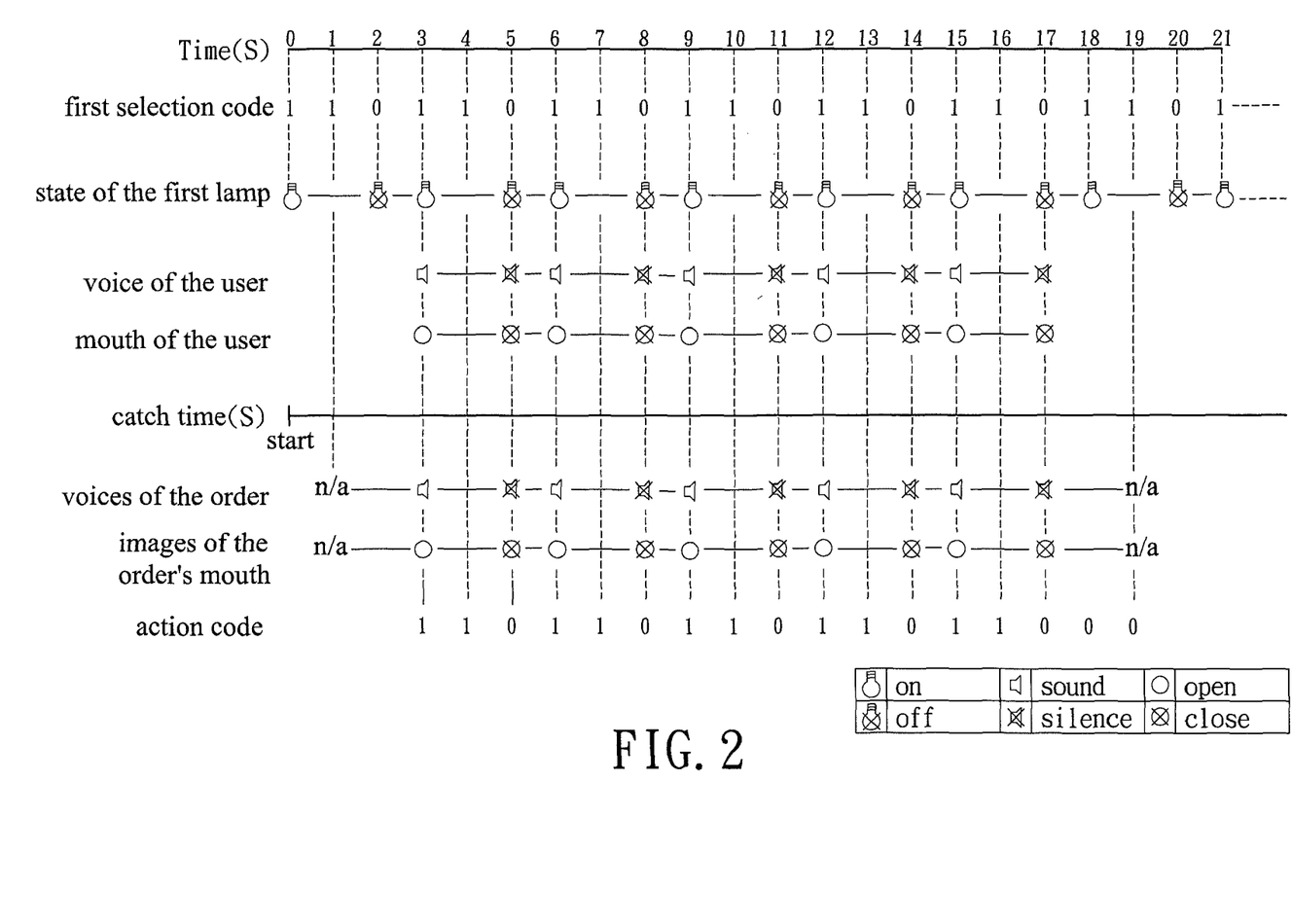
FIG. 2 is an operation-time diagram of the control system based on image or voice identification in accordance with said first embodiment.

Now referring to FIG. 2, because all the selection codes are binary codes and are presented by the display unit 12 with the two states, only two different expressions, voices, motions or gestures corresponding to the two states of the display unit 12 are necessary to be defined. Namely, for giving the order, the user can express one of the states by one of the two different expressions, voices, motions or gestures and express the other state by the other one. Preferably, when giving the order, the user continuously and alternatively expresses the two different expressions, voices, motions or gestures by following the change of the two states in the same speed, to precisely give an order matching the chosen selection code, which will then be caught by the order-catching device 2. Besides, for avoiding the order to correspond to merely a part of the chosen selection code, the user must keep on giving the order for a period of time longer than the predetermined cycle time. Preferably, the user should keep on giving the order until the order is actually received and interpreted by file control device 3.

The previous example is further disclosed as the following for illustration about how the user gives the order after observing the listing device 1. Initially, an expression such as "opened mouth" or a human sound such as "ah" is defined for the user to express a lighted lamp 13, while an expression such as "closed mouth" or a silence is defined for the user to express a darkened lamp 13, with the lamps 13 being turned on or off for 1 second to represent "1" or "0" of the binary selection codes. Thereby, when the user chooses the first selection code "110110" for "turning on a TV", he can express the first selection code by keeping his mouth "open for 2 seconds, close for 1 second, open for 2 seconds, and close for 1 second" or keeping his voice "loud for 2 seconds, down for 1 second, loud for 2 seconds, and down for 1 second". Besides, instead of "opened/closed mouth", motions such as "raised/bowed head", "left/right turned head", "clenched/loosed hand", etc. are also suitable for the user to express the binary selection code. As a result, in comparison with conventional control systems that requires various motions or gestures to operate, the present invention needs only two different expressions, voices, motions or gestures to achieve the same purpose. Furthermore, said two different expressions, voices, motions or gestures can be adjusted by the user, so that the user can operate the control system of the present invention conveniently.

Please refer to FIG. 1 again. The order-catching device 2 is selected from a CCD camera, a CMOS camera or a recorder, which electrically connects to the control device 3 for delivering images or voices of the order to the control device 3 after catching said order. The order-catching device 2 keeps on working in a catch time, which is preferably continuous to avoid missing any order made by the user.

The control device 3 has an action database 31 that also stores the selection codes corresponding with the electric actions. The control device 3 interprets the order to obtain an action code that is also a binary code and compares the action code with the selection codes stored in the action database 31 to find a corresponding electric action of the action code. Therefore, if the user expresses correctly, the action code generated by the control device 3 is identical to the chosen selection code.

Now, the previous example is still for disclosed as the following for illustration about how the control device 3 generates the action code. Turning to FIG. 2 again, after the control device 3 receives the images or voices of the order caught and delivered by the order-catching device 2, the control device 3 interprets the order that is given by the user through keeping his mouth "open for 2 seconds, close for 1 second, open for 2 seconds, and close for 1 second" or keeping his voice "loud for 2 seconds, down for 1 second, loud for 2 seconds, and down for 1 second". With a definition as "opening mouth for 1 second" or "giving a human sound for 1 second" representing "1" and "closing mouth for 1 second" or "being silent for 1 second" representing "0" of the binary action code, the order is interpreted to obtain the action code "110110". The obtained action code "110110" is then compared with the first selection code "110110", the second selection code "011011", and the third selection code "100100". Thus, the chosen selection code "110110" corresponding with the electric action, "turning on a TV", is identified. As a result, the control device 3 successfully receives the demand that the user desires.

Finally, according to the action code, the control device 3 sends a control signal to the acting device 4 that electrically connects with the control device 3, to control the acting device 4 performing the electric action corresponding to the selection code that matches the action code. Consequently, the acting device 4 may perform the electric action that the user desires.

Figure 3:
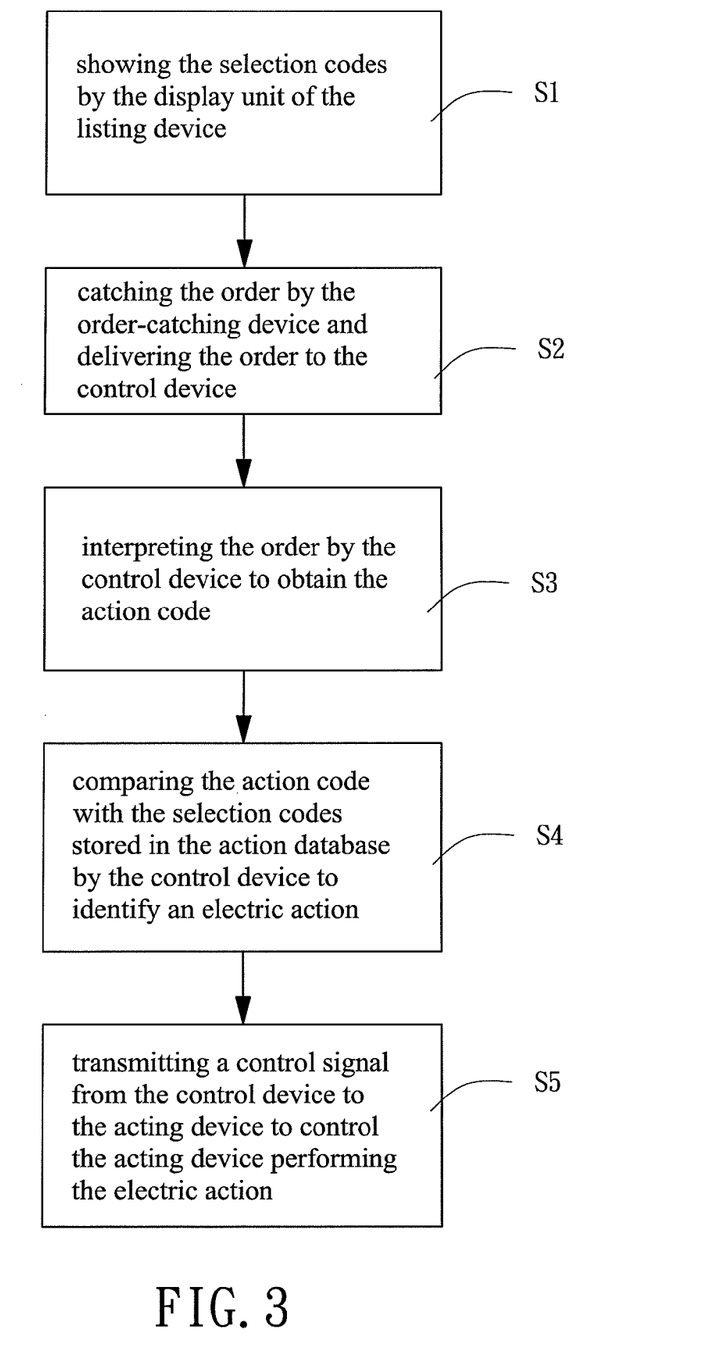
FIG. 3 is a flowchart illustrating the operating steps of the control system based on image or voice identification in accordance with said first embodiment.

Now referring to FIG. 3, the control method for controlling the first embodiment of the present control system includes the following steps.

First step S1 is showing the selection codes by the display unit 12 of the listing device 1 continuously for the user to observe. Thus, the user may choose one of the selection codes to give the order through expressing the two different expressions, voices, motions or gestures by following the chosen selection code in the same speed.

Second step S2 is catching images or voices of the order given by the user through the order-catching device 2 and, delivering the caught order to the control device 3.

Third step S3 is interpreting the order by the control device 3 to obtain the action code.

Fourth step S4 is comparing the action code with the selection codes stored in the action database 31 by the control device 3, to identify the electric action corresponding to the selection code that is identical to the action code. Preferably, when interpreting the order and comparing the action code with the selection codes, the control device 3 automatically picks a selection code most similar to the action code if no result is obtained after the comparison between the action code and the selection codes. Therefore, even if the user gives an incorrect order, there would be a good chance for the control device 3 to control the acting device 4 performing an electric action that the user actually desires.

Fifth step S5 is transmitting a control signal from the control device 3 to the acting device 4, to control the acting device 4 performing the electric action.

Figure 4:
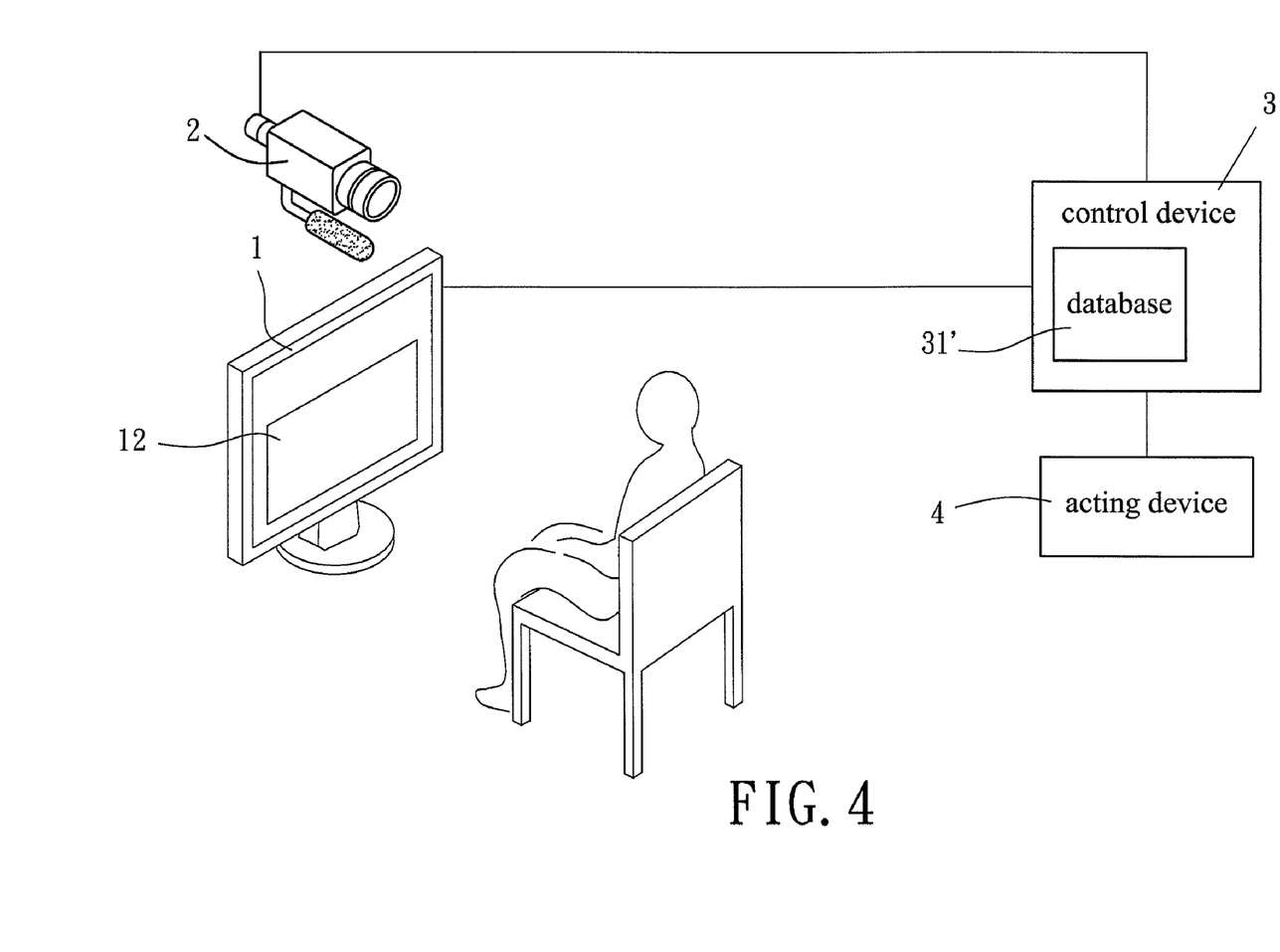
FIG. 4 is a structural sketch illustrating a control system based on image or voice identification in accordance with a second embodiment of the present invention.

Now turning to FIG. 4, a second embodiment of the control system of the present invention is illustrated. What is different from the first embodiment is that the listing device 1 of the second embodiment directly connects to the control device 3 and that a database 31' storing the selection codes is applied to substitute the list database 11 of the listing device 1 and the action database 31 of the control device 3. Moreover, the control device 3 and the display unit 12 of the second embodiment are preferably a host and a monitor of a computer, and the selection codes are shown through the monitor by software such as Flash, Gif figures, VB Script, Java Script and Java Applet. Thereby, when the acting device 4 is also the host of the computer, the user may control the computer by making sounds or motions, such that overuse of wrists for typing may be avoided.

Figure 5:
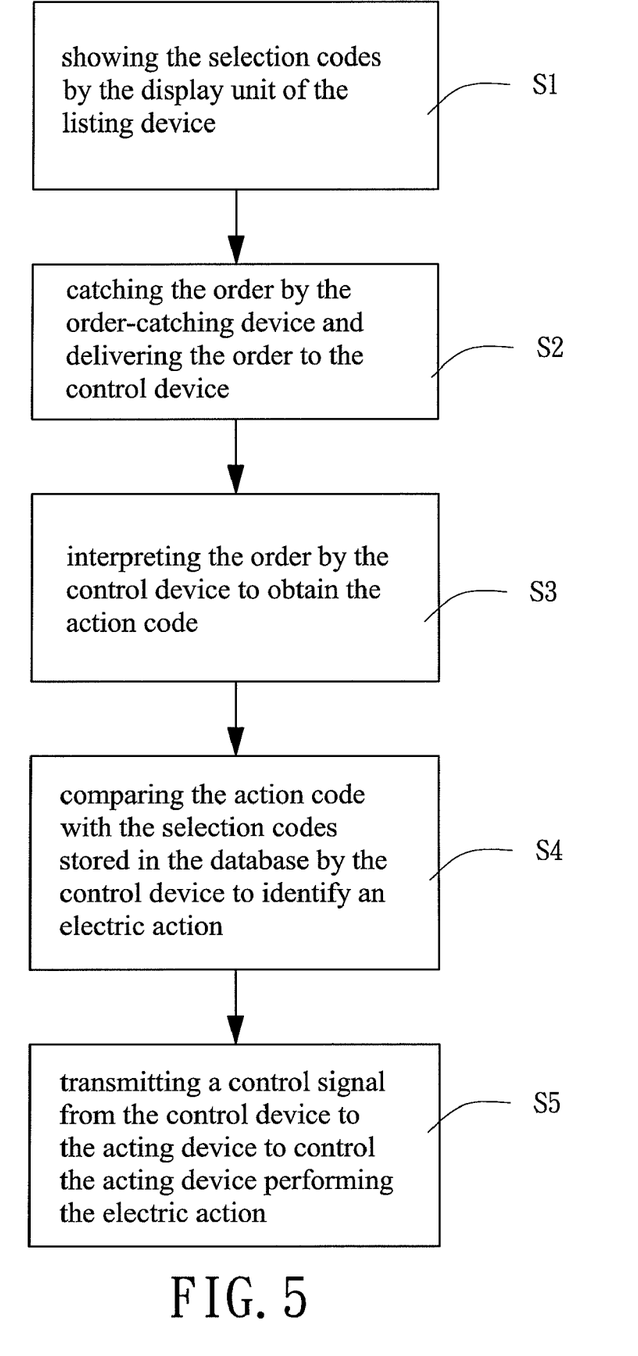
FIG. 5 is a flowchart illustrating the operating steps of the control system based on image or voice identification in accordance with said second embodiment.

Now referring to FIG. 5, the control method for controlling the second embodiment of the present control system includes the following steps.

First step S1 is showing the selection codes by the display unit 12 of the listing device 1 continuously for the user to observe. Thus, the user may choose one of the selection codes to give the order through expressing the two different expressions, voices, motions or gestures by following the chosen selection code in the same speed. Besides, the electric actions corresponding to the selection codes are computer processes like switching homepages, adjusting the volume, editing figures, and inputting information.

Second step S2 is catching images or voices of the order given by the user through the order-catching device 2 and delivering the caught order to the control, device 3. Because the display unit 12 is a monitor for the user to watch, the order-catching device 2 is preferably selected from a webcam focused on the user.

Third step S3 is interpreting the order by the control device 3 to obtain the action code.

Fourth step S4 is comparing the action code with the selection codes stored in the database 31' by the control device 3, to identify the electric action corresponding to the selection code that is identical to the action code.

Fifth step S5 is transmitting a control signal from the control device 3 to the acting device 4, to control the acting device 4 performing the electric action. The control device 3 and the acting device 4 may both be the host of the computer.

Figure 6:
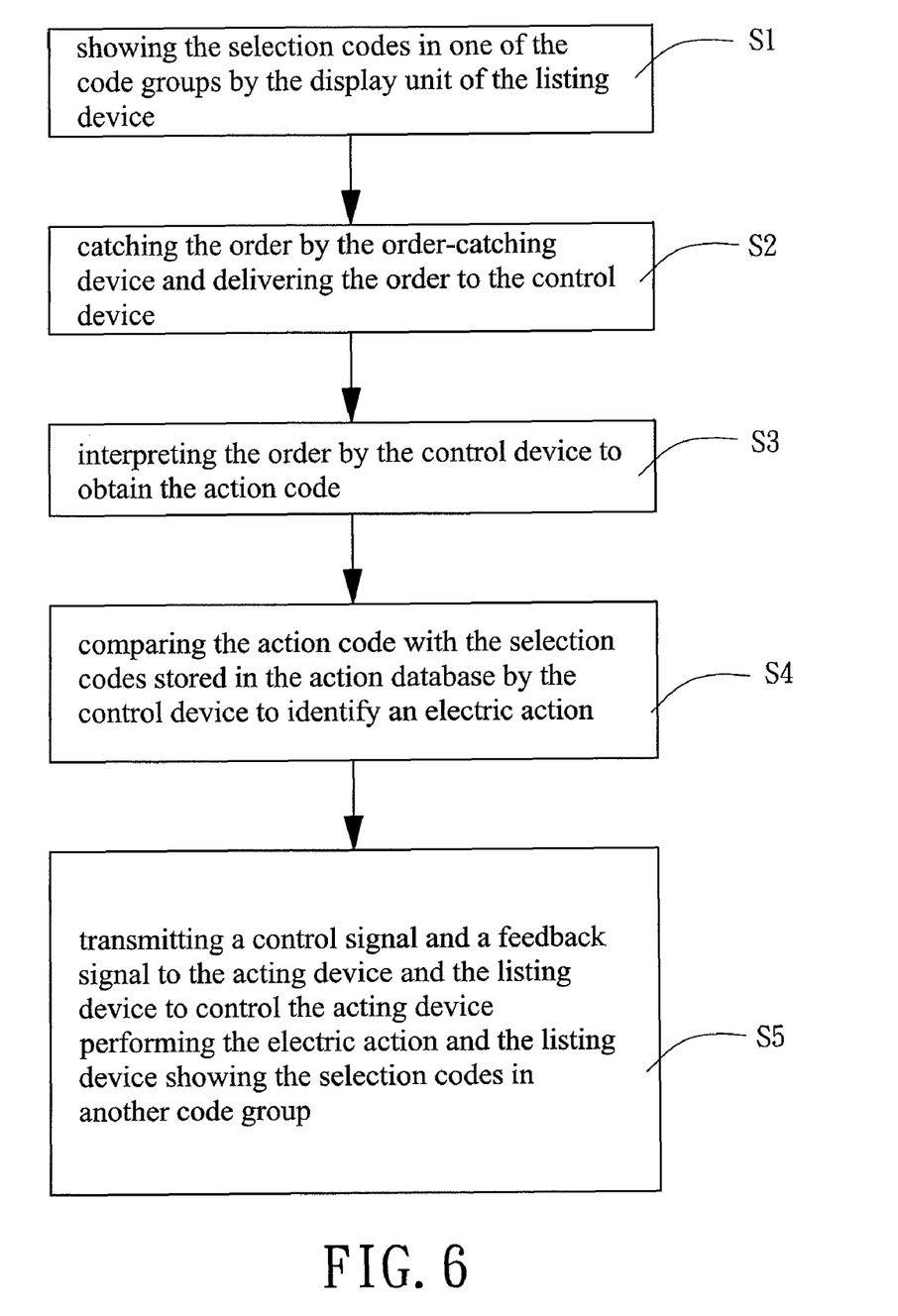
FIG. 6 is a flowchart illustrating the operating steps of the control system based on image or voice identification in accordance with a third embodiment.

Now turning to FIG. 6, a third embodiment of the control system of the present invention is illustrated. In the third embodiment, the listing device 1 electrically connects to the control device 3, and the selection codes are grouped into a plurality of code groups. Besides, those selection codes grouped in the same code group correspond with those electronic actions relative to the same function of the acting device 4. For instance, in the third embodiment, there may be three code groups. A first code group includes two selection codes corresponding with two electric actions, "turning on a TV" and "turning of a TV". A second code group includes six selection codes corresponding with six electric actions, "switching to Channel 1", "switching to Channel 2", "switching to Channel 3", "switching to Channel 4", "going back to the last group", and "going forward to the next group". A third code group includes four selection codes corresponding with four electric actions, "setting the volume to 15", "setting the volume to 20", "setting the volume to 25", and "going back to the last group".

Instead of showing all the selection codes at the same time, the display unit 12 merely shows the selection codes in one of the code group, and a decision for which code groups to be shown is made by the control device 3 or the user. In detail, the control device 3 will send a feedback signal to the listing device 1 while sending a control signal to the acting device 4, to control the display unit 12 showing the selection codes in another code group. In the other way, the user may choose and give an order of "going back to the last group" or "going forward to the next group" to change the code group shown by the display unit 12.

An example for illustration about the switching between the code groups is shown as the following. When the user chooses the selection code from the first code group and gives a first order for "turning on a TV", the control device 3 sends a feedback signal to the listing device 1 to control the display unit 12 showing the selection codes in the second code group while sending a control signal to the TV, that is, the acting device 4, to turn it on. Afterwards, the user may select one channel to watch, go forward to the third code group to adjust the volume of the TV, or go back to the first code group to turn off the TV through similar operation of the control device 3, display unit 12, and acting device 4. Therefore, the grouped selection codes make the selection codes easy to observe, and it is convenient for the user to use the present control system according to the functions of the acting device 4.

Now referring to FIG. 6 again, the control method for controlling the third embodiment of the present control system includes the following steps.

First step S1 is continuously showing the selection codes in one of the code groups by the display unit 12 of the listing device 1 for the user to observe. Thus, the user may choose one of the selection codes to give the order through expressing the two different expressions, voices, motions or gestures by following the chosen selection code in the same speed.

Second step S2 is catching images or voices of the order given by the user through the order-catching device 2 and delivering the caught order to the control device 3.

Third step S3 is interpreting the order by the control device 3 to obtain the action code.

Fourth step S4 is comparing the action code with the selection codes stored in the action database 31 by the control device 3, to identify the electric action corresponding to the selection code that is identical to the action code.

Fifth step S5 is transmitting a control signal and a feedback signal from the control device 3 to the acting device 4 and the listing device 1, to control the acting device 4 performing the electric action and the listing device 1 showing the selection codes in another code group. However, when the electric action is for controlling the listing device 1, there is no need for the control device 3 to send the feedback signal.

In comparison with the conventional control system, the present invention can show the electric actions corresponding to the binary selection codes through the display unit 12 for the user to observe and choose. Besides, owing to the binary selection codes applied in the present invention, the databases 11, 31, 31' can store several selection codes corresponding with electric actions for the user to choose, and the way for the user to give orders is simplified too. Moreover, the control device 3 can easily interpret the order, which is given according to the binary selection codes, caught by the order-catching device 2, to shorten the time for interpretation, decrease the occurrence of misinterpretation, and increase the accuracy of interpretation.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A control system based on image or voice identification, comprising:
    a listing device having a display unit showing a plurality of selection codes corresponding with a plurality of electric actions for a user to give an order according to one of the plurality of selection codes;
    an order-catching device catching the order given by the user;
    a control device electrically connecting to the order-catching device, interpreting the caught order, and thus obtaining an action code, with the control device having an action database storing said plurality of selection codes; and
    an acting device electrically connecting to the control device,
    wherein the plurality of selection codes and the action code are binary codes, and the display unit shows each of the plurality of selection codes by two alternative states.

2. The control system based on image or voice identification as defined in claim 1, wherein the two alternative states are shown with various lengths of time in a predetermined cycle time for representing the plurality of selection codes.

3. The control system based on image or voice identification as defined in claim 1, wherein the control device compares the obtained action code with the plurality of selection codes to identity an electric action corresponding to one of the plurality of selection codes identical to the action code, and then sends a control signal to the acting device to perform the identified electric action.

4. The control system based on image or voice identification as defined in claim 1, wherein the two alternative states are selected from different degrees of brightness and of sound, different colors, different characters and different patterns.

5. The control system based on image or voice identification as defined in claim 1, wherein the listing device further comprises a list database also storing said plurality of selection codes.

6. The control system based on image or voice identification as defined in claim 1, wherein the caught order is continuous images or voices caught from the user.

7. A control system based on image or voice identification, comprising:
    a control device having a database storing a plurality of selection codes corresponding with a plurality of electric actions;
    a listing device electrically connecting to the control device and having a display unit showing the plurality of selection codes for a user to give an order according to one of the plurality of selection codes;
    an order-catching device electrically connecting to the control device and catching the order given by the user; and
    an acting device electrically connecting to the control device,
    wherein the control device interprets the caught order and thus obtains an action code, wherein the plurality of selection codes and the action code are binary codes, and wherein the display unit shows each of the plurality of selection codes by two alternative states.

8. The control system based on image or voice identification as defined in claim 7, wherein the two alternative states are shown with various lengths of time in a predetermined cycle time for representing the plurality of selection codes.

9. The control system based on image or voice identification as defined in claim 7, wherein the control device compares the obtained action code with the plurality of selection codes to identify an electric action corresponding to one of the plurality of selection codes identical to the action code, and then sends a control signal to the acting device to perform the identified electric action.

10. The control system based on image or voice identification as defined in claim 7, wherein the control device compares the obtained action code with the plurality of selection codes to identify an electric action corresponding to one of the plurality of selection codes identical to the action code, and then sends a control signal to the control device itself to perform the identified electric action.

11. The control system based on image or voice identification as defined in claim 7, wherein the two alternative states are selected from different degrees of brightness and of sound, different colors, different characters and different patterns.

12. The control system based on image or voice identification as defined in claim 7, wherein the caught order is continuous images or voices caught from the user.

13. A control system based on image or voice identification, comprising:
    a listing device having a display unit showing a plurality of selection codes contained in one of plural code groups, with all of the plurality of selection codes in all the plural code groups corresponding with a plurality of electric actions for a user to give an order according to one of the plurality of selection codes;
    an order-catching device catching the order given by the user;
    a control device electrically connecting to the order-catching device and the control device, interpreting the caught order, and thus obtaining an action code, with the control device having an action database storing said plural code groups and the plurality of selection codes therein; and
    an acting device electrically connecting to the control device,
    wherein the plurality of selection codes and the action code are binary codes, and wherein the display unit shows each of the plurality of selection codes by two alternative states.

14. The control system based on image or voice identification as defined in claim 13, wherein the two alternative states are shown with various lengths of time in a predetermined cycle time for representing the plurality of selection codes.

15. The control system based on image or voice identification as defined in claim 13, wherein the control device compares the obtained action code with the plurality of selection codes to identify an electric action corresponding to one of the plurality of selection codes identical to the action code, and then sends a control signal to the acting device to perform the identified electric action and sends a feedback signal to the listing device to control the display unit showing the plurality of selection codes in another code group.

16. The control system based on image or voice identification as defined in claim 13, wherein the control device compares the obtained action code with the plurality of selection codes to identify an electric action corresponding to one of the plurality of selection codes identical to the action code, and then sends a control signal to the listing device to perform the identified electric action.

17. The control system based on image or voice identification as defined in claim 13, wherein the two alternative states are selected from different degrees of brightness and of sound, different colors, different characters and different patterns.

18. The control system based on image or voice identification as defined in claim 13, wherein the listing device further comprises a list database also storing said plurality of selection codes.

19. The control system based on image or voice identification as defined in claim 13, wherein the caught order is continuous images or voices caught from the user.

20. A control method based on image or voice identification, comprising:
    showing a plurality of selection codes by a display unit for a user to observe and give an order according to one of the plurality of selection codes;
    catching images or voices of the order given by the user through an order-catching device and delivering the caught order to a control device;
    interpreting the order to obtain an action code, searching a database, and identifying one of the plurality of selection codes identical to the action code by the control device; and
    transmitting a control signal from the control device to an acting device, with the control signal corresponding to the selection code, wherein the plurality of selection codes and the action code are binary codes and two alternative states are shown by the display unit with various lengths of time in a predetermined cycle time for representing the plurality of selection codes.

21. The control method based on image or voice identification as defined in claim 20, wherein the database stores the plurality of selection codes, and wherein the control device compares the action code with the plurality of selection codes to identify the identical selection code after obtaining the action code.

22. The control method based on image or voice identification as defined in claim 20, wherein the plurality of selection codes correspond with a plurality of electric actions, and wherein the acting device performs one of the plurality of electric actions corresponding to the selection code identical to the action code after the acting device receives the control signal.

23. The control method based on image or voice identification as defined in claim 20, wherein the acting device is the control device itself.

24. The control method based on image or voice identification as defined in claim 20, wherein the display unit shows the plurality of selection codes continuously.

25. The control method based on image or voice identification as defined in claim 20, wherein the plurality of selection codes is stored in a list database for the display unit to show and the database arranged in the control device.

26. The control method based on image or voice identification as defined in claim 20, wherein the plurality of selection codes is stored in the database, with the database being arranged in the control device.

27. The control system based on image or voice identification as defined in claim 20, wherein the caught order is continuous images or voices caught from the user.

28. A control method based on image or voice identification, comprising:
    showing a plurality of selection codes of one of plural code groups by a display unit for a user to observe and give an order according to one of the plurality of selection codes;

catching images or voices of the order given by the user through an order-catching device and delivering the caught order to a control device;

interpreting the order to obtain an action code, searching a database, and identifying one of the plurality of selection codes identical to the action code by the control device; and transmitting a control signal from the control device to an acting device, with the control signal corresponding to the selection code, wherein the plurality of selection codes and the action code are binary codes and two alternative states are shown by the display unit with various lengths of time in a predetermined cycle time for representing the plurality of selection codes.

29. The control method based on image or voice identification as defined in claim 28, wherein the control device sends a feedback signal to the display unit to control the display unit showing the plurality of selection codes in another code group when sending the control signal to the acting device.

30. The control method based on image or voice identification as defined in claim 28, wherein the plurality of selection codes correspond with a plurality of electric actions, and wherein the acting device performs one of the plurality of electric actions corresponding to the selection code identical to the action code after the acting device receives the control signal.

31. The control method based on image or voice identification as defined in claim 28, wherein the acting device is the control device itself.

32. The control method based on image or voice identification as defined in claim 28, wherein the database stores the plurality of selection codes in all of the plural code groups, and wherein the control device compares the action code with the plurality of selection codes to identify the identical selection code after obtaining the action code.

33. The control method based on image or voice identification as defined in claim 28, wherein the display unit shows the plurality of selection codes in the code group continuously.

34. The control method based on image or voice identification as defined in claim 28, wherein the plurality of selection codes is stored in a list database for the display unit to show and the database arranged in the control device.

35. The control method based on image or voice identification as defined in claim 28, wherein the plurality of selection codes is stored in the database, with the database being arranged in the control device.

36. The control system based on image or voice identification as defined in claim 28, wherein the caught order is continuous images or voices caught from the user.

* * * * *